NORMAN J. ROSENBURGH
ELMER O. WANGERIN
INVENTORS

ATTORNEYS

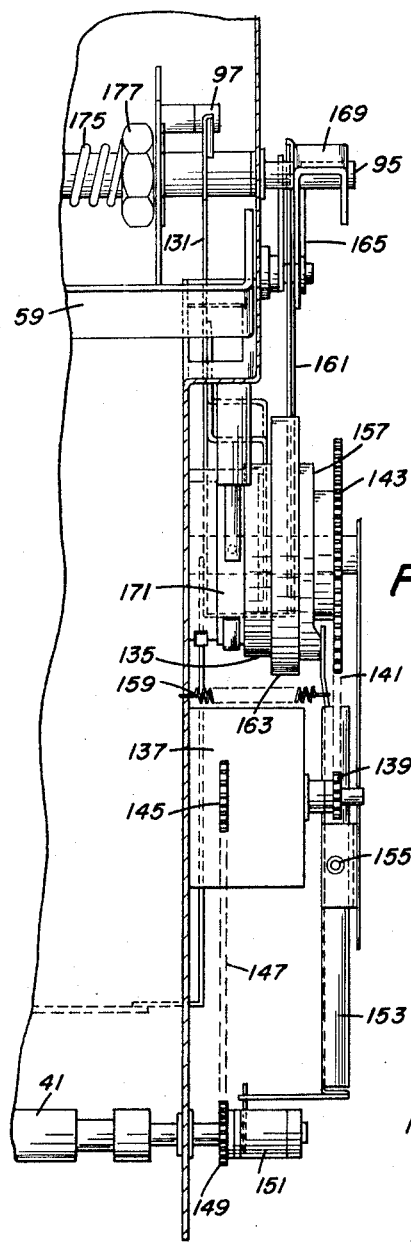

3,183,768
PROJECTION PRINTER
Norman J. Rosenburgh and Elmer O. Wangerin, Rochester, N.Y., assignors to Eastman Kodak Company, Rochester, N.Y., a corporation of New Jersey
Filed Dec. 18, 1961, Ser. No. 160,187
4 Claims. (Cl. 88—24)

This invention relates to a photographic projection printer and more particularly to a novel optical projection system for adapting a printer processor accessory for use with a projection reader.

It is well known in the art to enlarge through a suitable optical projection system microfilm images to facilitate their viewing. This can be accomplished by means of a projection film reader having a viewing screen. To facilitate legibility, the viewing screen is often considerably larger than the size of the document originally photographed so that the film image can also be similarly enlarged. Sometimes hard copies or prints of the microfilm images are required. However, the large size of the projected image while advantageous for viewing purposes is not necessarily a desirable feature for print-making purposes because of cost considerations and because of the unwieldy nature of such a large print. Thus a hard copy print should be considerably smaller than the size of a good sized viewing screen and can be approximately the size of the document originally photographed or even smaller. It is to an apparatus for obtaining such hard copies or prints that this invention relates.

The projection printer to be described herein has a printing station which is closer (along the optical projection axis) to the image in the film gate of the projection reader than is the viewing screen. This means that the image which is directed to the printing station would be smaller than that which is directed to the viewing screen and necessitates changing the focus of the projection optics. The projection printer accessory of the present invention comprises broadly means for decreasing the magnification of the projection system when an image is being projected to the printing station and means for refocusing the projection system so that the image projected to the printing station, though smaller than that which had been projected and focused on the viewing screen of the reader, is in focus in the printing station.

The primary object of the present invention is therefore to provide an improved projection printer accessory for use with a projection reader.

Another object of the present invention is to provide for a projection printer an optical projection system for intercepting an image being projected onto the viewing screen of the reader and direct the intercepted image to a printing station for exposure on a photosensitive print material, said system including means for decreasing the magnification of the projected image when directed to the printing station and for refocusing the projected image in the printing station.

Still other objects and advantages of the present invention will become readily apparent to those skilled in the art from the following description with reference to the drawings in which like characters denote like parts and wherein:

FIG. 1 is a schematic view of a projection printer accessory for attachment to a projection film reader utilizing the optical projection system of the present invention;

FIGS. 2A and B are elevation views showing the mechanism for operating the projection system of the present invention as it is incorporated in the projection printer accessory;

FIG. 3 is a view partly in section further illustrating the mechanism; and

Figure 1:
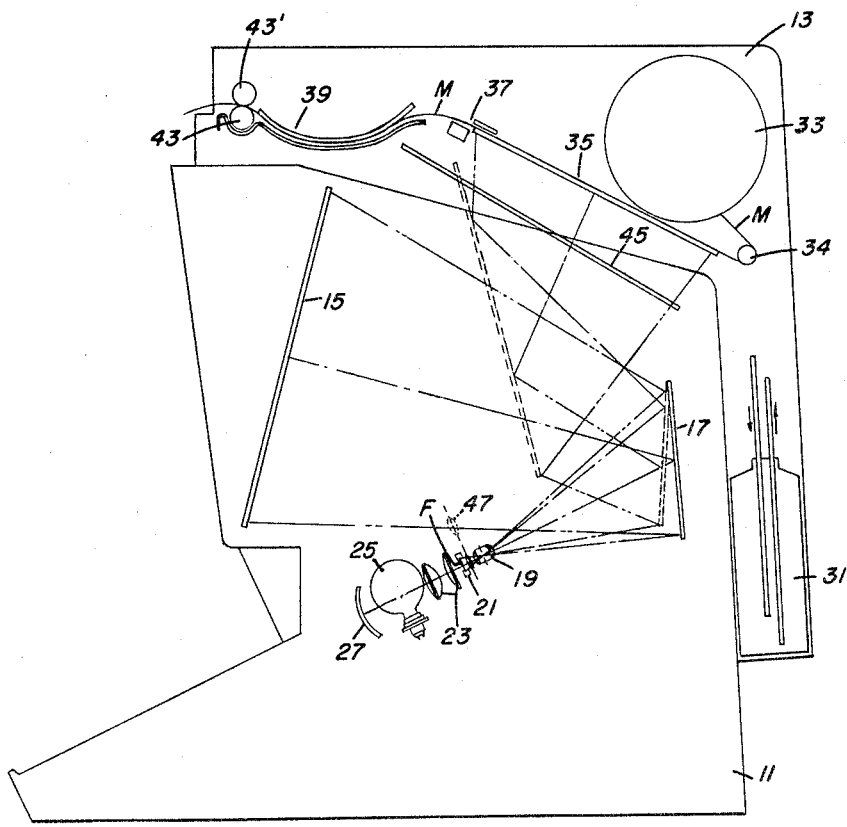

In the schematic illustration of FIG. 1, the numeral 11 designates generally a projection printer and the numeral 13 designates generally a printer accessory which is adapted to be attached to the projection reader and used therewith. The projection reader comprises a viewing screen 15, a rear projection mirror 17, a projection lens 19, a film gate 21, through which a film F can be moved by conventional means not shown but well known in the art, condensing optics 23, a projection lamp 25, and a reflector 27. In operation an image on the film F, for example microfilm, when in gate 21 is illuminated by lamp 25 and the image is projected by the lens 19 to mirror 17 and onto screen 15.

The projection printer 13 comprises a bottle 31, which contains a supply of monobath processing solution and is disposed in the lower rear portion of the housing, a roll 33 of photosensitive print material M, a driven roller 34 for moving print material from roll 33 to a printing station 35 and after exposure through a cutoff station 37, and a processing station 39. The processing unit in the processing station 39 includes squeegee drive rollers 43 and 43' for discharging the processed print material to the front of the projection printer. In order to direct the projected image from the film F to the printing station 35, the printer includes mechanism for pivoting rear mirror 17 of the reader toward the viewing screen 15 and an upper mirror 45 down into the path of the projected image. These latter described positions of the mirrors are indicated in FIG. 1 by the dotted outlines of the mirrors. In addition, the printer comprises means for shifting a plate or element 47 out of alignment with the projection optics when an exposure in the station 35 is to be made. The mechanism of the projection printer which controls and initiates the various movements mentioned above will be better understood with reference to FIGS. 2, 3, and 4.

Figure 2A:
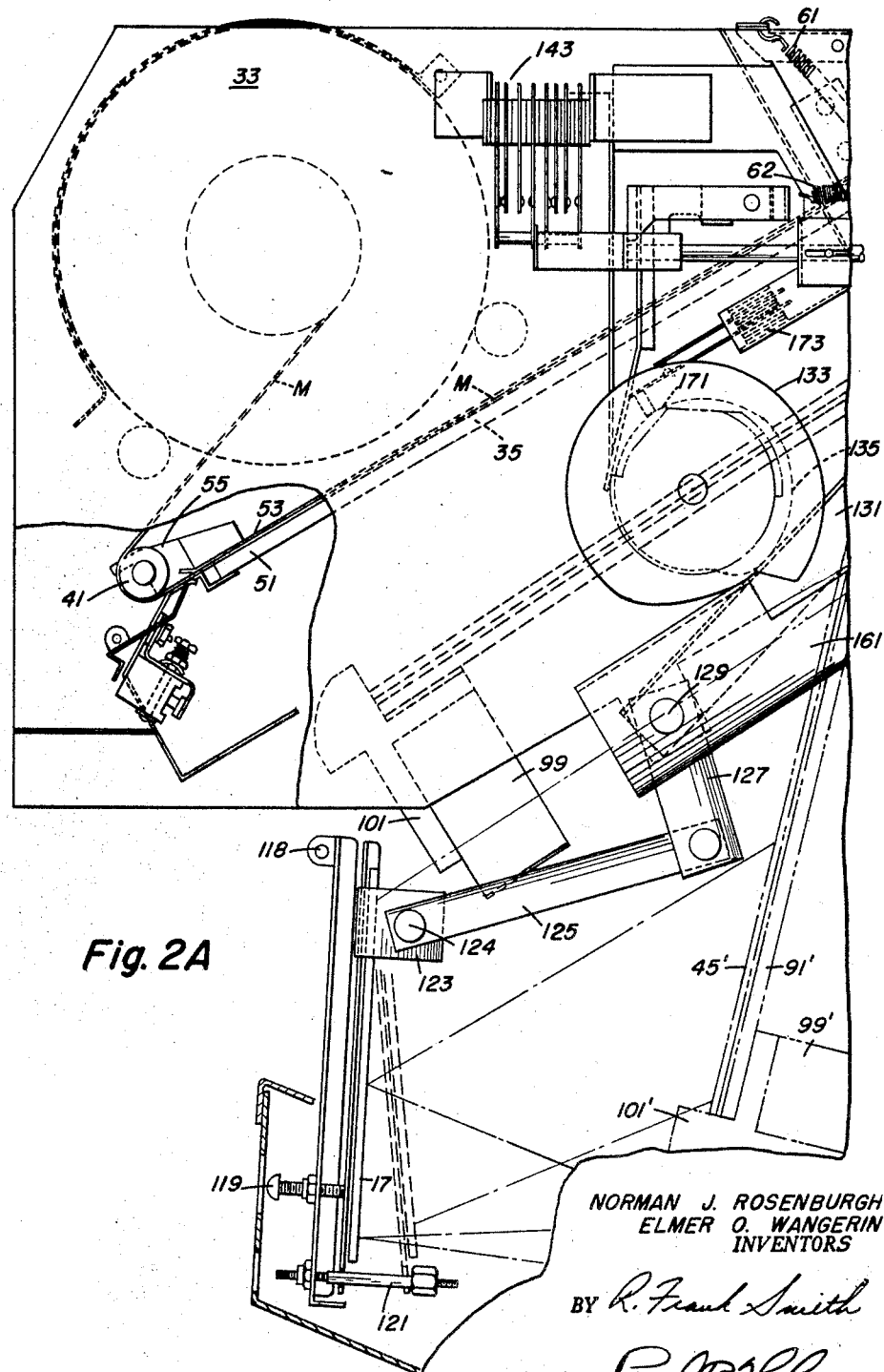
Figure 2B:
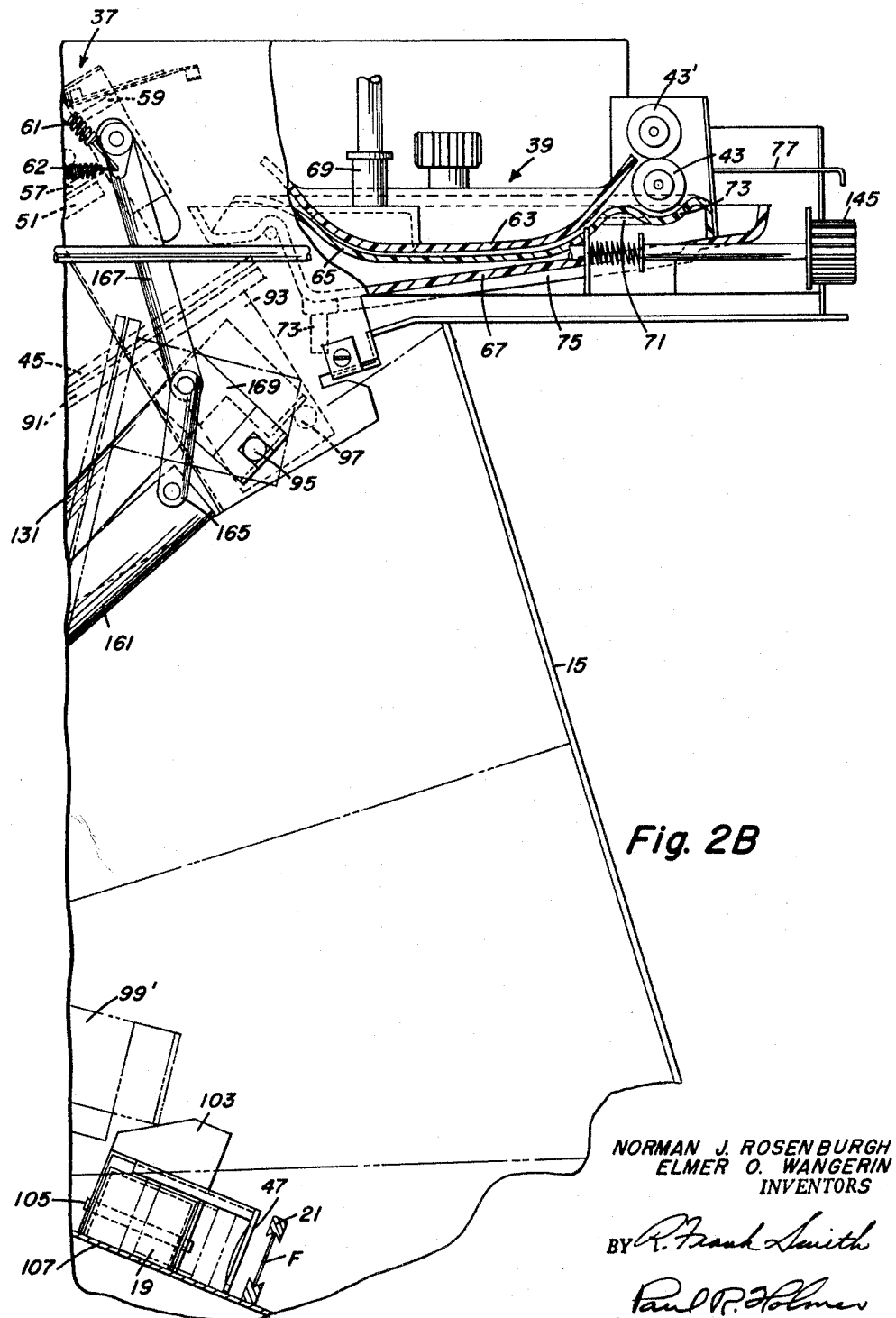

Photosensitive print material M is drawn from roll 33 by means of driven roller 34 and pushed into the printing station 35 above glass platen 51. The material M is maintained in close contact with the platen 51 by the weight of a pressure plate 53 which is held in position by means of a bracket 55 which is latched around the shaft for the drive roller 34. At the other end of the printing station 35 is the cutoff station 37. The cutoff station comprises a fixed knife 57 and a movable knife 59 which is urged by springs 61 and 62 into edge contact with the cutting edge of fixed knife 57. Springs similar to 61 and 62 are mounted in a similar way to the corresponding parts on the other side of the projection printer. Prior to cutoff of the material M a lever mechanism, hereinafter described, draws the movable knife 59 to a position below the fixed knife 57 which position is shown in FIG. 2. The exposure mechanism will be described hereinafter in greater detail. After exposure of the material M in the printing station 35, the drive roller 41 moves the exposed print material through the cutoff station 37 and into the processing station 39 where it is contacted with a processing solution to develop and stabilize the exposed image on the material. Rollers 43 and 43' are driven at a slower peripheral speed than roller 34 and since the path through which the print material M moves between the cutoff station 37 and the rollers 43 and 43' is not as long as the length of the exposed section of print material, a small loop of material builds up between the cutoff station 37 and the processing station 39. When the driven roller 34 stops the movable knife 59 is released so that it is raised with respect to the fixed knife 57 by means of springs 61 and 62 severing the exposed print material M from the unexposed material. The squeegee rollers 43 and 43' continues after the severing operation and draw the print material M through the processing station 39 and discharge the developed and stabilized print to the front of the machine where it is received by the operator.

The processing station 39 comprises an upper tray 63, a middle tray 65, and a bottom tray 67, see FIG. 2. The upper and middle trays form a generally arcuate path for guiding the print material M therebetween. A monobath type processing solution, that is, one containing ingredients for developing and then stabilizing a latent image on a photosensitive print material, is pumped from the bottle 31 (see FIG. 1) by means of a suitable pump, not shown, through fitting 69 in tray 63 into the processing station 39 where it substantially fills the lower arcuate portion of the path between the upper tray and the middle tray. Excess solution passes over the weir 71 in the middle tray 65 and flows by gravity through drain holes 73 and the drain groove 75 in lower tray 67, through fitting 73 and back into bottle 31. The print material M, after being processed by the solution in the path between the trays 63 and 65, is discharged by squeegee rollers 43 and 43' to the front of the printer over shelf 77.

Figure 4:
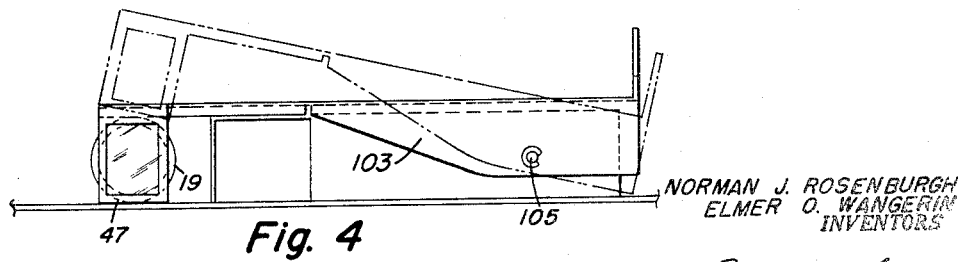
FIG. 4 is a front elevation view of the focus and magnification changing element used in accordance with the present invention.

The mechanism for obtaining print exposure will now be described. Mirror 45 is carried by support 91 which is fixed on a bracket 93 and pivotally mounted about shaft 95. Bracket 93 also carries a control roller 97, the purpose of which will be hereinafter explained. A camming link 99 is fixed to support 91 by means of a bracket 101 on the other end of mirror 45. In FIG. 2, mirror 45 is shown in its raised position, that is, the position at which it effectively screens the print material M in the printing station 35 from stray light and in which it does not interfere with the projection of an image from film F onto the viewing screen 15 of the projection reader. The lower position of mirror 45 is indicated in phantom in FIG. 2 and the parts are designated with a corresponding numeral prime. In that lower position, camming link 99 engages the bracket 103 which is pivotally mounted about a short shaft 105 and supported by base member 107 of the projection reader. Bracket 103 carries the focus and magnification shifting element 47 which was previously mentioned. The structure of bracket 103 and the arrangement of element 47 therein is further illustrated in FIG. 4. In FIG. 4, the lens 19 is shown in phantom in order to facilitate the disclosure of the other parts. When camming link 99 engages bracket 103, the bracket is pivoted about shaft 105 and element 47 is raised out of the path of the projected image from lens 19. This effectively changes the focus and the magnification of the projected image so that it will fit the smaller size of the printing station 35 and be in focus thereat.

During projection of an image onto the viewing screen 15, rear mirror 17 which is pivotally mounted about a shaft 118 fixed in the reader, is disposed in the position shown by the solid lines in FIG. 2. A mirror stop 119 permits minor adjustment to be made in this position. When a print exposure is being made, the mirror 17 is moved forward to engage mirror stop 121 (which is also adjustable) and in this position, indicated in phantom in FIG. 2, the mirror directs the projected image to mirror 45 which in turn directs the image to the printing station 35 where it exposes the print material M therein. A bracket 123 is fixed on the support for mirror 17, is pivotally connected to lever 125 by pin 124 and lever 125 is pivotally connected to link 127. Link 127 is mounted for pivotal movement about shaft 129 and is rigidly attached to mirror cam follower 131. The other end of follower 131 is positioned for engagement with control roller 97 on bracket 93.

The program cam for the printer is generally designated by the numeral 133. Cam 133 has five distinct cam surfaces which are best shown in FIG. 3. The cam surface which controls the mirror movement, and incidentally the element movement as described above is surface 135. The program cam 133 is driven by means of the cam motor 137 from sprocket 139, chain 141 and sprocket 143. Cam motor 137 is energized through an electrical circuit through program switch 143 which is closed when the operator presses the print button 145 located at the front of the apparatus. Drive roller 41 is also driven by cam motor 137 from sprocket 145, chain 147, sprocket 149 and through a one-way wire clutch 151. Actuation of clutch 151 is controlled by the clutch shift lever 153 which is pivoted with respect to the frame of the apparatus at 155 and is held in contact with the face of cam surface 147 of the program cam 133 by means of a spring 159.

The movement of the movable knife 59 in the cutoff station 37 is also controlled by program cam 133. The chopper cam follower 161 is mounted for pivotal movement around shaft 129 and engages the surface 163 of the program cam. The other end of the follower 161 is pivotally connected to a drag link 165, and the drag link is connected to the left chopper crank 169. The chopper crank is fixed on the mirror pivot shaft 95 and the other end of the chopper link is connected directly to the movable knife 59. Thus, as the program cam 133 commences its rotation the movable knife 59 is drawn downwardly with respect to the fixed knife 57 through the linkage just described. Then, when cam 163 has been rotated sufficiently far, cam follower 161 drops off the high spot of the cam and permits the upper knife springs 61 and 62 to pull the cutting edge of movable knife 59 in edge contact over the cutting edge of fixed knife 57 to sever the print material M which, as previously described is then positioned between the knives in the cutoff station 37. Surface 171 of the program 133 controls the operation of the projection lamp 25 in the projection reader through switch 173. While mirror 45 is moving down into the position occupied during exposure lamp 25 is off so as to not fog the print material in station 35. During print exposure it is on. During movement of mirror 45 back up to its position occupied when an image is being projected onto screen 15 for viewing and after the mirror is in that last-mentioned position the circuit to the lamp is again closed and the lamp is lit. The counterweight spring 175, best shown in FIG. 3, is tensioned by the nut 177, and when the cam 133 moves so that mirror cam follower 131 is in the low spot on the surface 135, mirror 45 is moved back up to its upper position in the printer by the action of spring 175.

It will now be apparent to those skilled in the art that the projection printer of the present invention is adapted by means of a novel optical projection system to be utilized with a standard projection reader. Without basically changing the structure of the projection reader, the arrangement disclosed compensates for a change in focus and also magnification of a projected image, when a print of the projected image is to be made.

The invention has been described in detail with particular reference to preferred embodiments thereof, but it will be understood that variations and modifications can be effected within the spirit and scope of the invention as described hereinabove and as defined in the appended claims.

Having now particularly described our invention, what we desire to secure by Letters Patent of the United States and what we claim is:

1. A photographic printer accessory for use in a device which is adapted to project images for viewing from an image-bearing member, said device having:

(a) a viewing screen,
(b) a projecting station for receiving said image-bearing member, and
(c) an optical projection system for projecting an image from the member in said projecting station through an optical path onto said screen, said system having a magnification such that the projected image on said screen has a predetermined size, said accessory comprising:

(1) a printing station for receiving a section of photosensitive print material, said printing station being smaller than the size of said projected image on said screen, (2) means positionable in said path for directing the projected image to said printing station for exposure on the print material, and (3) means operatively associated with movement of said directing means for reducing the magnification of said system when said directing means is positioned in said path so that the projected image directed to said printing station is sufficiently reduced in size to fit the printing station and is focused on the print material therein.

2. An accessory in accordance with claim 1 and wherein said magnification reducing means comprises a supplemental optical element and means for shifting said element out of said optical path upon movement of the directing means into said path.

3. An accessory in accordance with claim 1 and wherein said directing means comprises a reflector which during viewing of projected images on said screen is disposed out of said path and covers said printing station to prevent stray light from exposing print material therein, and which during print exposure moves away from the printing station into said path to direct the projected image to said printing station.

4. An accessory in accordance with claim 3 and wherein said magnification reducing means comprises a supplemental optical element mounted on a bracket for movement between a first position in which the element is disposed in said optical path and a second position wherein said element is removed from said optical path, and means carried by said reflector for engaging and moving said bracket upon movement of the reflector into said optical path to shift the element from said first to said second position.

References Cited by the Examiner
UNITED STATES PATENTS

| 2,256,397 | 9/41 | Luboshez | 88—24 |
| 2,437,898 | 3/48 | Swanson | 88—24 |
| 2,517,414 | 8/50 | Pratt et al. | 88—24 |

NORTON ANSHER, *Primary Examiner.*

EMIL G. ANDERSON, *Examiner.*